Nov. 14, 1939.  G. P. HARRINGTON  2,179,930
HOSE COUPLING
Filed Sept. 10, 1937
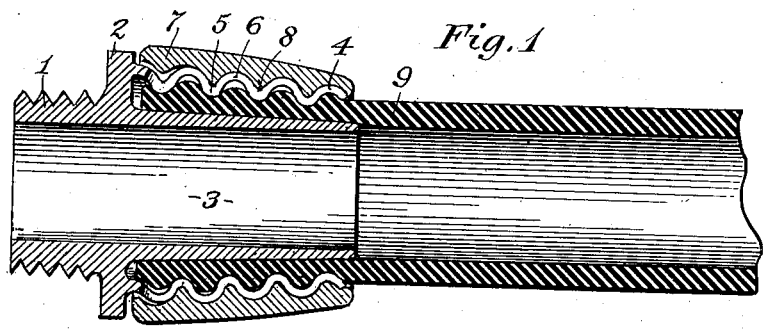
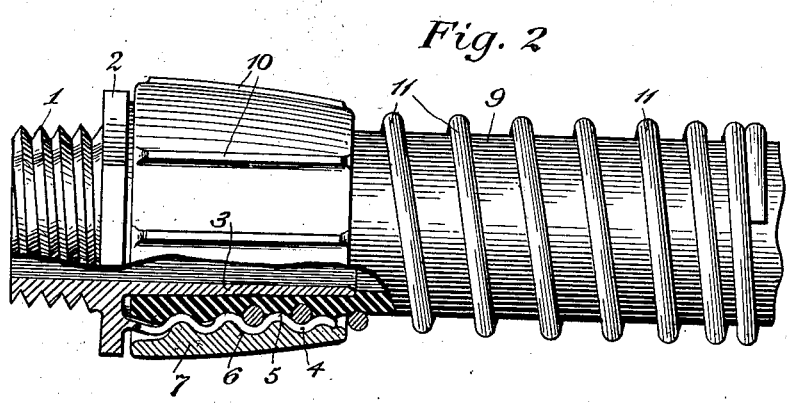
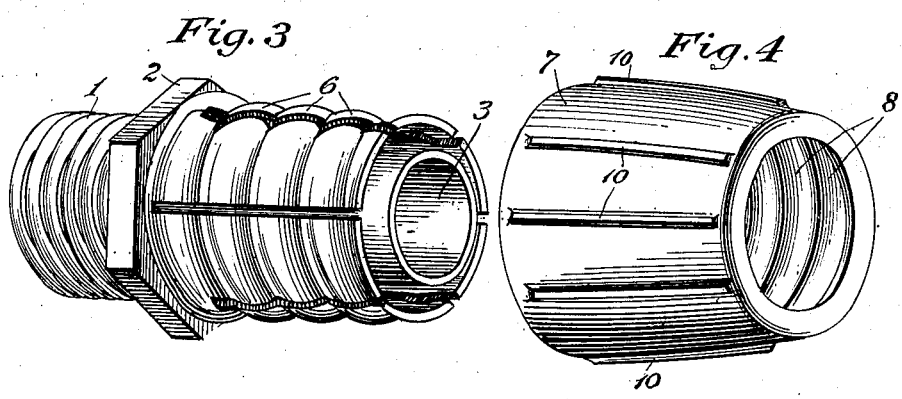
INVENTOR
George P. Harrington Patented Nov. 14, 1939

2,179,930

UNITED STATES PATENT OFFICE 2,179,930

HOSE COUPLING

George P. Harrington, Fairfield, Conn.

Application September 10, 1937, Serial No. 163,164

3 Claims. (Cl. 285—86)

This invention relates to hose couplings, and particularly to such couplings as are adapted to rubber or synthetic rubber hose, which usually includes fabric or metal reinforcement.

The object of the invention is to provide an improved coupling that has a minimum number of parts, is reasonably light in weight and is not cumbersome.

Another object of the invention is to provide a coupling which will stay tight and leak-proof.

A further object of the invention is to provide a coupling which can be easily installed or removed without the use of special tools.

A still further object of the invention is to provide a coupling which can be applied to used hose, even though the latter may be swollen or deteriorated due to oil or other destructive materials.

The invention is fully described in the following specification and while in its broader aspects it is capable of embodiment in a number of forms a preferred design is illustrated in the drawing, in which:

Figure 1 is a central longitudinal section of the essential parts of the coupling attached to hose.

Fig. 2 is a side elevation of a modification of the coupling attached to hose, a portion of this figure being in central longitudinal section.

Fig. 3 is a perspective view of all the essential parts of the coupling except the collar.

Fig. 4 is a perspective view of the collar.

Referring to Figure 1, a coupling of the present invention is provided with a projecting sleeve 1 having the usual male thread suitable for engaging a pipe collar or female coupling thread. The coupling is provided with a shoulder portion 2, usually of hexagonal or octagonal shape, adjacent the sleeve and adapted to be engaged by a vice or wrench. A shank or waterway portion 3 extends from the opposite face of the shouldered portion and is provided with a bore which is a continuation of the bore in sleeve 1. The shank or waterway portion is adapted to be inserted into the end of a hose 9, as shown in Fig. 1. A compression sleeve 4 is formed on the face of the shouldered portion and extends outwardly therefrom for slightly less than the full length of the portion 3 and is adapted to surround the hose when the hose is inserted on said shank portion. This compression sleeve is longitudinally slit and is provided on its inner and outer surface with screw threads 5 and 6. The inner screw threads 5 are adapted to be moved into engagement with the hose and more particularly are adapted to interengage with a spiral metal reinforcement 11 used on the same.

In order to effectively clamp the coupling to the hose, a collar or nut 7 having an internal tapered bore provided with threads 8 is adapted to be threaded on the compression sleeve with the largest diameter of the tapered bore first engaging the sleeve. As the threaded sleeve is screwed along the compression sleeve, the tapered bore will cause the sections of the compression sleeve to flex inwardly and grip the hose with a tight interfitting grip. The outer surface of the sleeve is provided with outstanding ribs 10 or any other suitable roughened surface whereby it may be gripped with the usual wrench for tightening the same so as to lock the coupling to the hose.

Assembly of the coupling onto the hose is more or less as follows:

First, the collar portion is pulled over the end of the hose and pushed back a short distance temporarily out of the way. The larger threads on the inside of this tapered collar should face the end of the hose.

If a spring guard is to be used, this is next pushed over the end of the hose and spaced back a short distance.

Next, the hose is pushed or screwed into the recess between shank 3 and sleeve 4. To facilitate easy assembly it is usually advisable to clamp the shoulder 2 in a vice. If the hose is somewhat oversize the compression sleeve 4 may be opened farther away from shank 3, using a screw driver or other suitable device.

If the wire guard is used, it should next be pushed or threaded into the inside thread 5 of sleeve 4—one turn of the wire under the compression sleeve is usually adequate.

Lastly, the collar 7 is pulled up and screwed onto the outside thread 6 of the compression sleeve 4 until, in its tight position, considerable compression is made against the hose.

The invention, as illustrated and described, has certain practical advantages over other couplings for rubber hose. The inside grooves of the compression sleeve are not only designed to accommodate a spring guard but to provide a desirable uneven surface for gripping the hose. These recesses being in the form of a thread allow the hose to be turned into desired position so that during assembly the end of the hose can be located near or against the shoulder of the coupling. This feature is especially important in the case of swollen or oversize hose, which are difficult to work and hold in position without the aid of the thread.

The outside threads of the compression sleeve preferably follow along the inner grooves, with more or less even thickness of metal separating the contours. This not only permits a lighter coupling but means that the compression sleeve has more or less even strength and resistance to being pried up or pressed down against the cover of the hose.

As compared to the smaller usual sized threads, the relatively large threads on the outside of the compression sleeve and on the inside of the collar are less apt to become crossed or stripped by the tightening operation during assembly.

The device of the present invention provides a coupling having exceptional flexibility in accommodating undersize or oversize hose. For undersize hose, a spring guard or helix should be positioned under the compression sleeve several turns. This will permit sufficient compression to be generated against the hose wall at the time the collar is tightened. For full-size hose, the spring guard may be inserted only a fraction of a turn or else abandoned entirely. Most rubber-like materials swell when in contact with oils or solvents. In extreme cases of swollen or oversize hose the compression sleeve may be opened, by prying with a suitable tool, to the point where the hose can be inserted but where the collar will not be large enough in diameter to engage the sleeve. In these circumstances a clamp or other suitable tightening tool may be temporarily used to pull the compression sleeve down into the hose sufficiently to enable the collar to engage the threads and thereby compress the sleeve.

During the actual tightening operation when the collar is being turned into position there is a very slight movement of the compression members against the hose. This means that the attachment can be made with minimum injury to the hose cover—a particularly important consideration in the case of oil-soaked or otherwise deteriorated hose.

Having described the invention, what I claim is new and desire to secure by United States Letters Patent, is:

1. A hose coupling of the class described comprising a shank adapted to be inserted into the bore of the hose and having an integral shoulder at one end to form an abutment against which the end of the hose bears; a split resilient compression sleeve integral with said shoulder and adapted to surround the exterior of the hose, the splits in said sleeve being extended from the hose end of the sleeve to a point in spaced relation to the shoulder so the end of the hose is totally enclosed, said sleeve being also provided with coarse inner and outer threads; and a co-operating collar having a tapered bore threaded to engage the outer threads on the compression sleeve and movable therealong to force the resilient sleeve into tight engagement with the hose.

2. A hose coupling of the class described comprising a shank adapted to be inserted into the bore of the hose and having an integral shoulder at one end to form an abutment against which the end of the hose bears; a split resilient compression sleeve integral with said shoulder, the splits in said sleeve being extended from the hose end of the sleeve to a point in spaced relation to the shoulder so the end of the hose is totally enclosed, said sleeve being provided with coarse inner threads suitable for engaging a spring guard positioned on the exterior of the hose, said sleeve having also coarse outer threads; and a collar having a tapered bore threaded to engage the outer threads of said compression sleeve and force same with the wire guard into tight engagement with the hose.

3. A hose coupling of the class described comprising a rigid shank for insertion into the bore of the hose; a split resilient compression sleeve adapted to surround the hose and having coarse inner threads suitable for receiving the helical spring guard for the hose, said compression sleeve having also coarse outer threads; and a rigid collar having a tapered bore provided with threads adapted to be screwed onto exterior of compression sleeve and force same with the spring guard into tight engagement with the hose, said sleeve and collar being capable of accommodating, prior to tightening of the collar, hose varying in outer diameter, the spring guard being movable to be fully inserted under the compression sleeve for hose of relatively small outer diameter and only partially inserted under the compression sleeve for hose that is relatively large in outer diameter.

GEORGE P. HARRINGTON.